United States Patent
Nakamura et al.

(10) Patent No.: US 9,718,978 B2
(45) Date of Patent: Aug. 1, 2017

(54) INK SET

(71) Applicant: Seiko Epson Corporation, Tokyo (JP)

(72) Inventors: Miho Nakamura, Shiojiri (JP); Yasunari Ikeda, Shiojiri (JP); Hideki Oguchi, Fujimi (JP); Takeshi Yano, Shiojiri (JP); Shinichi Naito, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/062,662

(22) Filed: Mar. 7, 2016

(65) Prior Publication Data

US 2016/0264803 A1    Sep. 15, 2016

(30) Foreign Application Priority Data

Mar. 10, 2015 (JP) ................. 2015-047612

(51) Int. Cl.
*C09D 11/54* (2014.01)
*C09D 11/40* (2014.01)
*C09D 11/328* (2014.01)
*C09D 11/103* (2014.01)

(52) U.S. Cl.
CPC .......... *C09D 11/328* (2013.01); *C09D 11/103* (2013.01); *C09D 11/40* (2013.01)

(58) Field of Classification Search
CPC ................. C09D 11/54; C09D 11/40
See application file for complete search history.

(56) References Cited

U.S. PATENT DOCUMENTS

| | | | |
|---|---|---|---|
| 2010/0013875 A1* | 1/2010 | Diederen | B41J 2/2114 347/7 |
| 2013/0213440 A1* | 8/2013 | Ohta | C09D 11/30 134/22.11 |
| 2015/0307687 A1* | 10/2015 | Yamazaki | B41J 2/16552 347/28 |

FOREIGN PATENT DOCUMENTS

| | | |
|---|---|---|
| JP | 2012-103389 A | 5/2012 |
| JP | 2013-159752 A | 8/2013 |

* cited by examiner

*Primary Examiner* — Veronica F Faison
(74) *Attorney, Agent, or Firm* — Harnes, Dickey & Pierce, P.L.C.

(57) ABSTRACT

There is provided an ink set including a water-based cleaning transportation liquid, and a disperse dye ink composition, in which the water-based cleaning transportation liquid includes water and at least one of an aromatic sulfonate formalin condensate and a lignin sulfonate as a dispersing agent I, without including a coloring material, and the disperse dye ink composition includes a disperse dye, water, and a dispersing agent II.

12 Claims, No Drawings

INK SET

BACKGROUND

1. Technical Field

The present invention relates to an ink set.

2. Related Art

With ink jet recording methods, it is possible to record high-definition images with a comparatively simple apparatus and ink jet recording methods have been rapidly developed in a number of ways. Various studies have been carried out with regard to the maintenance of the recording apparatus. For example, JP-A-2013-159752 discloses an ink jet recording apparatus cleaning solution which contains at least water, a water-soluble organic solvent, and melamine resin fine particles with an object of providing an ink jet recording apparatus cleaning solution which has an extremely small adverse effect on the ink jet recording apparatus, a sufficiently high cleaning effect, and which is also effective for cleaning a filter.

However, in a case where the ink composition includes a disperse dye, even when using the cleaning solutions of the related art described in JP-A-2013-159752 and the like, there are problems in that foreign matter is easily generated and the discharge stability is impaired.

SUMMARY

An advantage of some aspects of the invention is that it provides an ink set with which foreign matter is not easily generated and discharge stability is not impaired when carrying out maintenance.

The present inventors carried out intensive research in order to solve the problems described above. As a result, it was found that it is possible to solve the problems described above by using a combination of a predetermined water-based cleaning transportation liquid and a disperse dye ink composition, thereby completing the invention.

That is, the invention is as follows.

[1] An ink set including a water-based cleaning transportation liquid; and a disperse dye ink composition, in which the water-based cleaning transportation liquid includes water and at least one of an aromatic sulfonate formalin condensate and a lignin sulfonate as a dispersing agent I, without including a coloring material, and the disperse dye ink composition includes a disperse dye, water, and a dispersing agent II.

[2] The ink set according to [1], in which a content I of the dispersing agent I with respect to a total amount of the water-based cleaning transportation liquid is 2.0 mass % to 30 mass %, a content II of the dispersing agent II is 2.0 mass % or more with respect to the total amount of the disperse dye ink composition, and a ratio A of the content II with respect to the content I (content II/content I) is 0.10 to 3.0.

[3] The ink set according to [2], in which the content I of the dispersing agent I with respect to the total amount of the water-based cleaning transportation liquid is 5.0 mass % to 15 mass %, the content II of the dispersing agent II is 2.0 mass % or more with respect to the total amount of the disperse dye ink composition, and the ratio A of the content II with respect to the content I (content II/content I) is 0.30 to 2.0.

[4] The ink set according to [1], in which the content I of the dispersing agent I is with respect to the total amount of the water-based cleaning transportation liquid 2.0 mass % to 30 mass %, the content II of the dispersing agent II with respect to the total amount of the disperse dye ink composition is less than 2.0 mass %, and a ratio B of the content II with respect to the content I (content II/content I) is 0.050 to 1.3.

[5] The ink set according to [4], in which the content I of the dispersing agent I with respect to the total amount of the water-based cleaning transportation liquid is 5.0 mass % to 15 mass %, the content II of the dispersing agent II with respect to the total amount of the disperse dye ink composition is less than 2.0 mass %, and a ratio B of the content II with respect to the content I (content II/content I) is 0.15 to 0.50.

[6] The ink set according to any one of [1] to [5], in which the water-based cleaning transportation liquid further includes a moisturizing agent I, a content of the moisturizing agent I with respect to the total amount of the water-based cleaning transportation liquid is 5.0 mass % to 30 mass %, the disperse dye ink composition further includes a moisturizing agent II, and a content of the moisturizing agent II with respect to the total amount of the disperse dye ink composition is 5.0 mass % to 30 mass %.

[7] The ink set according to any one of [1] to [6], in which the water-based cleaning transportation liquid further includes a surface tension adjusting agent, and a surface tension of the water-based cleaning transportation liquid is 35 mN/m or less.

[8] The ink set according to any one of [1] to [7], in which the water-based cleaning transportation liquid further includes a pH adjusting agent I, a pH of the water-based cleaning transportation liquid is 7.0 to 10.0, the disperse dye ink composition further includes a pH adjusting agent II, and a pH of the disperse dye ink composition is 7.0 to 10.0.

[9] The ink set according to any one of [1] to [8], in which the dispersing agent II includes at least one of an aromatic sulfonate formalin condensate and a lignin sulfonate.

[10] The ink set according to any one of [1] to [9], in which at least one of the dispersing agent I and the dispersing agent II includes at least one of an aromatic sulfonate formalin condensate Na salt and an aromatic sulfonate formalin condensate Ca salt.

[11] The ink set according to any one of [1] to [10], in which at least one of the dispersing agent I and the dispersing agent II includes at least one of a lignin sulfonate Na salt and a lignin sulfonate Ca salt.

[12] The ink set according to any one of [1] to [11], in which at least one of the dispersing agent I and the dispersing agent II includes a naphthalene sulfonate formalin condensate.

DESCRIPTION OF EXEMPLARY EMBODIMENTS

Detailed description will be given below of embodiments (referred to below as "the present embodiment") of the invention; however, the invention is not limited thereto and various modifications are possible within a range not departing from the spirit of the invention.

Ink Set

The ink set of the present embodiment includes a water-based cleaning transportation liquid, and a disperse dye ink composition, in which the water-based cleaning transportation liquid includes water and at least one of an aromatic sulfonate formalin condensate and a lignin sulfonate as a dispersing agent I, without including a coloring material, and the disperse dye ink composition includes a disperse dye, water, and a dispersing agent II.

Here, the "cleaning transportation liquid" is a liquid which is filled in at least one of an ink container or an ink flow path either before ink is filled therein or when the recording apparatus is not used for a long time for the purpose of having an effect of discharging bubbles at the time of filling the ink or suppressing the generation of foreign matter during long periods of non-use, or the like. The filling location and the filling amount of the cleaning transportation liquid is not particularly limited and the cleaning transportation liquid may be filled in at least a portion of the ink container or the ink flow path.

In addition, in a case where an ink jet recording apparatus is not used to record images for a long time or in a case where discharge defects occur, it is possible to replace the ink with the cleaning transportation liquid in at least one of the ink container or the ink flow path. It is possible to carry out the replacement with the cleaning transportation liquid by allowing the cleaning transportation liquid to flow into at least one of the ink container or ink flow path filled with inks to replace the ink in at least one of the ink container or ink flow path with the cleaning transportation liquid. At this time, prior to the cleaning transportation liquid flowing in, the ink in at least one of the ink container or ink flow path may be discharged outside of the system.

On the other hand, the cleaning transportation liquid may be replaced with ink in a case of restarting image recording using the ink jet recording apparatus, by allowing the ink to flow into at least one of the ink container or ink flow path filled with the cleaning transportation liquid to discharge the cleaning liquid from a nozzle opening section. At this time, prior to the ink flowing in, the cleaning liquid in at least one of the ink container or ink flow path may be discharged from the nozzle opening section.

In addition, the ink and the cleaning transportation liquid may be filled by being replaced during a normal cleaning operation in order to fill at least one of the ink container or ink flow path with the ink or the cleaning transportation liquid. In addition, the nozzle opening surface of the recording head is sealed by a cap to be connected with the cap by a suction pump and the ink or the cleaning transportation liquid may be filled by generating a negative pressure in the cap using the suction pump and circulating the ink or the cleaning transportation liquid in the ink flow path. In the following, the operations of replacing the water-based cleaning transportation liquid with the disperse dye ink composition, or replacing the disperse dye ink composition with the water-based cleaning transportation liquid are both referred to as "maintenance".

During maintenance, the dispersion stability in the disperse dye ink composition may be impaired and foreign matter may be generated by the disperse dye ink composition coming into contact with the water-based cleaning transportation liquid. In addition, depending on the degree to which foreign matter is generated, there is a concern that clogging will occur in the nozzles of the recording apparatus and that the discharge stability will be impaired.

In contrast, due to the ink set of the present embodiment having the structure described above, even in a case where the disperse dye ink composition and the water-based cleaning transportation liquid come into contact, it is possible to suppress the generation of foreign matter and to secure the discharge stability without impairing the dispersion stability of the disperse dye ink composition. Description will be given below of each component.

Here, the "ink flow path" has the meaning of a flow path for circulating ink in the ink jet recording apparatus. Examples of the ink flow path include an ink supply path for supplying ink to an ink jet type recording head from an ink container in which ink is stored, and a flow path for allowing ink to flow up to a nozzle opening section in an ink jet type recording head.

Water-Based Cleaning Transportation Liquid

The water-based cleaning transportation liquid includes water, at least one of an aromatic sulfonate formalin condensate and a lignin sulfonate as a dispersing agent I without including a coloring material, and it is possible for the water-based cleaning transportation liquid to include other components as necessary.

Water

Examples of the water include ion exchange water, ultrafiltration water, reverse osmosis water, pure water such as distilled water, and water from which ionic impurities are removed as much as possible such as ultrapure water. The content of the water with respect to the total amount of the water-based cleaning transportation liquid is preferably 45 mass % to 85 mass %, more preferably 50 mass % to 80 mass %, even more preferably 60 mass % to 75 mass %.

Dispersing Agent I

The dispersing agent I is at least one of aromatic sulfonate formalin condensate and the lignin sulfonate. By using such a dispersing agent, the generation of foreign matter is further suppressed during maintenance and the discharge stability after ink replacement is further improved without impairing the dispersion stability of the disperse dye ink composition. Here, in the present embodiment, the "aromatic sulfonate formalin condensate" includes salts of aromatic sulfonate formalin condensates.

Examples of the aromatic sulfonate formalin condensate are not particularly limited; however, examples thereof include formalin condensates of alkylnaphthalene sulfonates such as creosote oil sulfonate, cresol sulfonate, phenol sulfonate, β-naphthol sulfonate, methyl naphthalene sulfonate, and butyl naphthalenesulfonate; formalin condensates of β-naphthalenesulfonate and β-naphthol sulfonate; formalin condensate of cresol sulfonate and 2-naphthol-6-sulfonate; and salts thereof.

Anions which are able to form aromatic sulfonate formalin condensates, lignin sulfonates, and salts are not particularly limited; however, examples thereof include alkali metals such as lithium, sodium, potassium; and alkaline earth metals such as magnesium and calcium. Among these, sodium and calcium are preferable. By using such salts, the generation of foreign matter is further suppressed during maintenance and the discharge stability after ink replacement tends to be further improved.

As one aspect, the dispersing agent I preferably includes at least one of an aromatic sulfonate formalin condensate Na salt and an aromatic sulfonate formalin condensate Ca salt, more preferably includes a naphthalene sulfonate formalin condensate, and even more preferably includes at least one of a naphthalene sulfonate formalin condensate Na salt and a naphthalene sulfonate formalin condensate Ca salt. By using the dispersing agent I, since stability at low temperatures to room temperature is comparatively improved, the generation of foreign matter is further suppressed during maintenance and the discharge stability after ink replacement tends to be further improved.

In addition, as another aspect, the dispersing agent I preferably includes at least one of a lignin sulfonate Na salt and a lignin sulfonate Ca salt. Since the stability from room temperature to high temperatures is comparatively improved by using such a dispersing agent I, the generation of foreign matter is further suppressed during maintenance and the discharge stability after ink replacement tends to be further improved.

The content I of the dispersing agent I with respect to the total amount of the water-based cleaning transportation liquid is preferably 2.0 mass % to 30 mass %, more preferably 3.0 mass % to 20 mass %, even more preferably 5.0 mass % to 15 mass %. When the content I of the dispersing agent I is 2.0 mass % or more, the generation of foreign matter is further suppressed during maintenance and the discharge stability after ink replacement tends to be further improved. In addition, when the content I of dispersing agent I is 30 mass % or less, the discharge stability after ink replacement tends to be further improved.

Moisturizing Agent I

Water-based cleaning transportation liquid may further include a moisturizing agent I. The moisturizing agent is not particularly limited; however, it is possible to use a moisturizing agent of which the boiling point at one atmosphere pressure equivalent is preferably 180° C. or more, and more preferably a moisturizing agent with a high boiling point at 200° C. or more. When the boiling point is in the range described above, it is possible to prevent volatilization of volatile components in the water-based cleaning transportation liquid.

The moisturizing agent I is not particularly limited; however, examples thereof include glycerin, ethylene glycol, propylene glycol, diethylene glycol, triethylene glycol, pentamethylene glycol, trimethylene glycol, 2-butene-1,4-diol, 2-ethyl-1,3-hexane diol, 2-methyl-2,4-pentanediol, tripropylene glycol, polyethylene glycol, polypropylene glycol, 1,3-propylene glycol, isopropylene glycol, isobutylene glycol, mesoerythritol, pentaerythritol, or the like.

The content of the moisturizing agent I with respect to the total amount of the water-based cleaning transportation liquid is preferably 5.0 mass % to 30 mass %, more preferably 10 mass % to 25 mass %, even more preferably 15 mass % to 22.5 mass %. When the content of the moisturizing agent I is 5.0 mass % or more, the moisture retention is improved, whereby it is possible to further suppress the formation of solid matter which is hard to dissolve and it tends to be possible to further suppress damage to the recording apparatus caused by freezing. In addition, when the content of the moisturizing agent I is 30 mass % or less, the cleanness tends to be further improved.

Surface Tension Adjusting Agent

The water-based cleaning transportation liquid may further include a surface tension adjusting agent. The surface tension adjusting agent is not limited; however, examples thereof include acetylene glycol-based surfactants, fluorochemical surfactants, silicone-based surfactants, and the like.

The acetylene glycol-based surfactant is not particularly limited; however, the acetylene glycol-based surfactant is preferably one or more kinds selected from 2,4,7,9-tetramethyl-5-decyne-4,7-diol and alkylene oxide adducts of 2,4,7,9-tetramethyl-5-decyne-4,7-diol, and 2,4-dimethyl-5-decyne-4-ol and alkylene oxide adducts of 2,4-dimethyl-5-decyne-4-ol. Commercially available acetylene glycol-based surfactant products are not limited; however, examples thereof include the Olfine 104 series and the E series such as Olfine E1010 (product names, produced by Air Products Japan, Inc.), Surfynol 465 and Surfynol 61 (product names, produced by Nissin Chemical Industry Co., Ltd.), and the like. The acetylene glycol surfactant may be used alone or may be used in a combination of two or more types.

The fluorochemical surfactant is not particularly limited; however, examples thereof include perfluoroalkyl sulfonates, perfluoroalkyl carboxylates, perfluoroalkyl phosphoric acid esters, perfluoroalkyl ethylene oxide adducts, perfluoroalkyl betaine, and perfluoroalkyl amine oxide compounds. Commercially available fluorochemical surfactant products are not particularly limited; however, examples thereof include S-144, S-145 (produced by Asahi Glass Co., Ltd.); FC-170C, FC-430, Fluorad-FC4430 (produced by Sumitomo 3M Co., Ltd.); FSO, FSO-100, FSN, FSN-100, FS-300 (produced by Dupont Co., Ltd.); FT-250 and 251 (produced by Neos Co., Ltd.), and the like. The fluorochemical surfactants may be used alone or may be used in a combination of two or more types.

Examples of the silicone-based surfactants include polysiloxane-based compounds, polyether-modified organosiloxane, and the like. Commercially available silicone-based surfactant products are not particularly limited; however, examples thereof include BYK-306, BYK-307, BYK-333, BYK-341, BYK-345, BYK-346, BYK-347, BYK-348, BYK-349 (product names, produced by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (product names, produced by Shin-Etsu Chemical Co., Ltd.), and the like. The silicone-based surfactants may be used alone or may be used in a combination of two or more types.

The content of the surface tension adjusting agent with respect to the total amount of the water-based cleaning transportation liquid is preferably 0.10 mass % to 1.5 mass %, more preferably 0.15 mass % to 1.0 mass %, even more preferably 0.25 mass % to 0.75 mass %. When the content of the surface tension adjusting agent is in the range described above, the cleanness tends to be further improved.

The surface tension of the water-based cleaning transportation liquid is preferably 35 mN/m or less. In addition, the surface tension of the water-based cleaning transportation liquid is preferably lower than the surface tension of the ink composition. When the surface tension of the water-based cleaning transportation liquid is in the range described above, the cleanness and initial filling property at the time of ink replacement tend to be further improved. It is possible to measure the surface tension of the water-based cleaning transportation liquid using the method described in the Examples.

pH Adjusting Agent I

The water-based cleaning transportation liquid may further include pH adjusting agent I. The pH adjusting agent I is not particularly limited; however, examples thereof include inorganic acids (for example, sulfuric acid, hydrochloric acid, nitric acid, or the like), inorganic bases (for example, lithium hydroxide, sodium hydroxide, potassium hydroxide, ammonia, or the like), organic bases (triethanolamine, diethanolamine, monoethanolamine, tripropanolamine), organic acids (for example, adipic acid, citric acid, succinic acid, or the like).

The content of the pH adjusting agent I with respect to the total amount of the water-based cleaning transportation liquid is preferably 0.10 mass % to 1.5 mass %, more preferably 0.15 mass % to 1.0 mass %, even more preferably 0.25 mass % to 0.75 mass %. When the content of the pH adjusting agent I is in the range described above, the attack property regarding the nozzle plate, resin portions, and metal portions of the recording apparatus is further reduced and the stability of the water-based cleaning transportation liquid also tends to be further improved.

The pH of the water-based cleaning transportation liquid is preferably 7.0 to 10.0. When the pH of the water-based cleaning transportation liquid is in the range described above, the attack property regarding the nozzle plate, resin portions, and metal portions of the recording apparatus is further reduced and the stability of the water-based cleaning transportation liquid also tends to be further improved.

Disperse Dye Ink Composition

The disperse dye ink composition includes a disperse dye, water, and the dispersing agent II and is able to include other components as necessary.

Disperse Dye

The disperse dye refers to a disperse dye which does not dissolve in the ink composition and which exists in a self-dispersed state or in a dispersion state brought about by a dispersing agent. Specific examples thereof include sublimation dyes and the like. The disperse dye is not particularly limited; however, examples thereof are listed below.

Yellow disperse dyes are not particularly limited; however, examples thereof include C.I. Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, 232, and the like.

Orange disperse dyes are not particularly limited; however, examples thereof include C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, 142 and the like.

Red disperse dyes are not particularly limited; however, examples include C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 266, 277, 278, 279, 281, 288, 298, 302, 303, 310, 311, 312, 320, 324, 328 and the like.

Violet disperse dyes are not particularly limited; however, examples thereof include C.I. Disperse Violet 1, 4, 8, 23, 26, 27, 28, 31, 33, 35, 36, 38, 40, 43, 46, 48, 50, 51, 52, 56, 57, 59, 61, 63, 69, 77, and the like.

Green disperse dyes are not particularly limited; however, examples thereof include C.I. Disperse Green 9 and the like.

Brown disperse dyes are not particularly limited; however, examples thereof include C.I. Disperse Brown 1, 2, 4, 9, 13, 19, and the like.

Blue disperse dyes are not particularly limited; however, examples thereof include C.I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 134, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 266, 267, 268, 270, 284, 285, 287, 288, 291, 293, 295, 297, 301, 315, 330, 333, 359, 360, and the like.

Black disperse dyes are not particularly limited; however, examples include C.I. Disperse Black 1, 3, 10, 24, and the like.

As one aspect, the content II of the dispersing agent II is preferably 2.0 mass % or more. Here, in a case of this aspect, the content of the disperse dye with respect to the total amount of the disperse dye ink composition is preferably 1.6 mass % to 8.5 mass %, more preferably 4.0 mass % to 8.0 mass %, even more preferably 4.5 mass % to 7.5 mass %.

As another aspect, the content II of the dispersing agent II is preferably less than 2.0 mass %. Here, in the case of this aspect, the content of the disperse dyes with respect to the total amount of the disperse dye ink composition is preferably 0.25 mass % to 3.5 mass %, more preferably 0.50 mass % to 3.0 mass %, even more preferably 0.75 mass % to 2.5 mass %.

Water

Examples of the water include ion exchange water, ultrafiltration water, reverse osmosis water, pure water such as distilled water, and water from which ionic impurities are removed as much as possible such as ultrapure water. The content of the water with respect to the total amount of the disperse dye ink composition is preferably 45 mass % to 75 mass %, more preferably 50 mass % to 70 mass %, and even more preferably 55 mass % to 65 mass %.

Dispersing Agent II

The dispersing agent II is not particularly limited; however, examples thereof include anionic dispersing agents, nonionic dispersing agents, and polymer dispersing agents.

The anionic dispersing agents are not particularly limited; however, examples thereof include formalin condensates of aromatic sulfonates, and lignin sulfonate. The aromatic sulfonates are not particularly limited; however, examples thereof include alkyl naphthalene sulfonates such as creosote oil sulfonate, cresol sulfonate, phenol sulfonate, β-naphthol sulfonate, methyl naphthalene sulfonate, butyl naphthalene sulfonate, a mixture of β-naphthalenesulfonate and β-naphthol sulfonate, a mixture of cresol sulfonate and 2-naphthol-6-sulfonate, and the like.

The nonionic dispersing agents are not particularly limited; however, examples thereof include ethylene oxide adducts of phytosterol, ethylene oxide adducts of cholestenol, and the like.

The polymer dispersing agents are not particularly limited; however, examples thereof include polyacrylic acid moiety alkyl ester, polyalkylene polyamine, polyacrylate, styrene-acrylic acid copolymer, vinyl naphthalene-maleic acid copolymer, and the like.

Among these, at least one of the aromatic sulfonate formalin condensates and the lignin sulfonate is preferable. By using the dispersing agent II, the generation of foreign matter during maintenance is further suppressed and the discharge stability after ink replacement tends to be further improved.

Anions which are able to form aromatic sulfonate formalin condensates, lignin sulfonates, and salts are not particularly limited; however, examples thereof include alkali metals such as lithium, sodium, and potassium; alkaline earth metals such as magnesium and calcium. Among these, sodium and calcium are preferable. By using such salts, the generation of foreign matter is further suppressed during maintenance and the discharge stability after ink replacement tends to be further improved.

As one aspect, the dispersing agent II preferably includes at least one of an aromatic sulfonate formalin condensate Na salt and an aromatic sulfonate formalin condensate Ca salt, more preferably includes a naphthalene sulfonate formalin condensate, and even more preferably includes at least one of a naphthalene sulfonate formalin condensate Na salt and a naphthalene sulfonate formalin condensate Ca salt. By using the dispersing agent II, since stability at low temperatures to room temperature is comparatively improved, the generation of foreign matter is further suppressed during maintenance and the discharge stability after ink replacement tends to be further improved.

In addition, in another aspect, the dispersing agent II preferably includes at least one of lignin sulfonate Na salt and lignin sulfonate Ca salt. Since the stability from room temperature to high temperatures is comparatively improved by using such a dispersing agent II, the generation of foreign matter is further suppressed during maintenance and the discharge stability after ink replacement tends to be further improved.

As one aspect, in a case where the content II of the dispersing agent II with respect to the total amount of the disperse dye ink composition is 2.0 mass % or more, the ratio A of the content II with respect to the content I (content II/content I) is preferably 0.10 to 3.0, more preferably 0.30 to 2.0, and even more preferably 0.50 to 1.5. In particular, in a case where the content I with respect to the total amount of the water-based cleaning transportation liquid is 5.0 mass % to 15 mass %, the ratio A (content II/content I) is preferably 0.30 to 2.0. When the ratio A is 0.10 or more, the generation of foreign matter is further suppressed during maintenance and the discharge stability after ink replacement tends to be further improved.

In addition, in another aspect, in a case where the content II of the dispersing agent II with respect to the total amount of the disperse dye ink composition is less than 2.0 mass %, the ratio A of the content II with respect to the content I (content II/content I) is preferably 0.050 to 1.3, more preferably 0.10 to 1.0 and even more preferably 0.15 to 0.50. In particular, in a case where the content I with respect to the total amount of the water-based cleaning transportation liquid is 5.0 mass % to 15 mass %, the ratio A (content II/content I) is preferably 0.15 to 0.50. When the ratio A is 0.050 or more, the generation of foreign matter is further suppressed during maintenance and the discharge stability after ink replacement tends to be further improved.

pH Adjusting Agent II

The disperse dye ink composition may further include a pH adjusting agent II. The pH adjusting agent II is not particularly limited; however, examples thereof include the pH adjusting agents listed as the pH adjusting agents I. The pH adjusting agent I and the pH adjusting agent II may be the same or may be different.

The content of the pH adjusting agent II with respect to the total amount of the disperse dye ink composition is preferably 0.10 mass % to 1.0 mass %, more preferably 0.15 mass % to 0.75 mass %, even more preferably 0.25 mass % to 0.50 mass %. When the content of the pH adjusting agent is in the range described above, the attack property regarding the nozzle plate, resin portions, and metal portions of the recording apparatus is further reduced and the stability of the water-based cleaning transportation liquid also tends to be further improved.

The pH of the disperse dye ink composition is preferably 7.0 to 10.0. When the pH of the disperse dye ink composition is in the range described above, the attack property regarding the nozzle plate, resin portions, and metal portions of the recording apparatus is further reduced and the stability of the water-based cleaning transportation liquid also tends to be further improved.

EXAMPLES

More specific description of the invention will be given with reference to Examples and Comparative Examples. The invention is not limited to the following Examples.

Materials for Water-Based Cleaning Transportation Liquid

The main materials for the water-based cleaning transportation liquid used in the Examples and the Comparative Examples are as follows.

Dispersing Agent I
  Naphthalene sulfonate Na formalin condensate
  Lignin sulfonate Na
  Naphthalene sulfonate Ca formalin condensate
  Styrene-acrylic copolymer
Moisturizing Agent I
  Glycerin
Surface Tension Adjusting Agent
  BYK348 (silicone surfactant, produced by BYK Japan KK)
pH Adjusting Agent I
  Triethanolamine Preparation of Water-Based Cleaning Transportation Liquid Each of water-based cleaning transportation liquids S-1 to 13 was obtained by mixing each material in the compositions shown in Table 1 below, and sufficiently stirring the result. Here, the unit of the numerical values in Table 1 below is mass % and the total thereof is 100.0 mass %.

Surface Tension

The surface tension of each of the water-based cleaning transportation liquids S-1 to 13 was measured using the Wilhelmy method using a fully automatic surface tension meter CBVP-Z (manufactured by Kyowa Interface Science Co., Ltd.).

pH

The pH of each of the water-based cleaning transportation liquids S-1 to 13 was measured using a pH Meter Model PH82 (manufactured by Yokogawa Electric Corporation).

TABLE 1

| | | Water-Based Cleaning Transportation Liquid | | | | | | |
|---|---|---|---|---|---|---|---|---|
| | | S-1 | S-2 | S-3 | S-4 | S-5 | S-6 | S-7 |
| Dispersing Agent I | Naphthalene sulfonate Na formalin condensate | 5 | — | — | 2.5 | — | — | 10 |
| | Lignin sulfonate Na | — | 5 | — | 2.5 | — | — | — |
| | Naphthalene sulfonate Ca formalin condensate | — | — | 5 | — | — | — | — |
| | Styrene-acrylic copolymer | — | — | — | — | 5 | — | — |
| Moisturizing Agent I | Glycerin | 20 | 20 | 20 | 20 | 20 | 20 | 20 |
| Surface Tension | BYK348 | 0.5 | 0.5 | 0.5 | 0.5 | 0.5 | 0.5 | 0.5 |

TABLE 1-continued

| | | Water-Based Cleaning Transportation Liquid | | | | | | |
|---|---|---|---|---|---|---|---|---|
| | | | S-1 | S-2 | S-3 | S-4 | S-5 | S-6 | S-7 |
| Adjusting Agent pH Adjusting Agent I | Triethanolamine | 0.5 | 0.5 | 0.5 | 0.5 | 0.5 | 0.5 | 0.5 |
| Water | Water | Remainder | Remainder | Remainder | Remainder | Remainder | Remainder | Remainder |

| | | Water-Based Cleaning Transportation Liquid | | | | | |
|---|---|---|---|---|---|---|---|
| | | S-8 | S-9 | S-10 | S-11 | S-12 | S-13 |
| Dispersing Agent I | Naphthalene sulfonate Na formalin condensate | 3 | 1.5 | 0.5 | 15 | 30 | 40 |
| | Lignin sulfonate Na | — | — | — | — | — | — |
| | Naphthalene sulfonate Ca formalin condensate | — | — | — | — | — | — |
| | Styrene-acrylic copolymer | — | — | — | — | — | — |
| Moisturizing Agent I | Glycerin | 20 | 20 | 20 | 20 | 20 | 20 |
| Surface Tension Adjusting Agent | BYK348 | 0.5 | 0.5 | 0.5 | 0.5 | 0.5 | 0.5 |
| pH Adjusting Agent I | Triethanolamine | 0.5 | 0.5 | 0.5 | 0.5 | 0.5 | 0.5 |
| Water | Water | Remainder | Remainder | Remainder | Remainder | Remainder | Remainder |

Materials for Ink Compositions

The main materials for the ink compositions used in the Examples and the Comparative Examples below are as follows.

Disperse Dye
  DY54 (Disperse Yellow 54)
  DR60 (Disperse Red 60)
  DB359 (Disperse Blue 359)
Dispersing Agent II
  Naphthalene sulfonate Na formalin condensate
Surface Tension Adjusting Agent
  BYK348 (silicone surfactant, produced by BYK Japan KK)
Solvent
  Glycerin
  Triethylene glycol
pH Adjusting Agent II
  Triethanolamine
Chelating Agent
  EDTA.2Na (tetra-acetic acid ethylene diamine)
Preservative
  Proxel GXL (produced by Avecia Ltd.)

Preparation of Disperse Dye Ink Composition

Each disperse dye ink compositions A-1 to 7 and B-1 to 2 was obtained by mixing each material in the compositions shown in Table 2 below and sufficiently stirring the results. Here, the unit of the numerical values in Table 2 below is mass % and the total thereof is 100.0 mass %.

Surface Tension

The surface tension of each disperse dye ink composition A-1 to 7 and B-1 to 2 was measured using the Wilhelmy method using a full automatic surface tension meter CBVP-Z (manufactured by Kyowa Interface Science Co., Ltd.).

pH

The pH of each disperse dye ink composition A-1 to 7 and B-1 to 2 was measured using a pH Meter Model PH82 (manufactured by Yokogawa Electric Corporation).

TABLE 2

| | | A Ink Group | | | | | | B Ink Group | |
|---|---|---|---|---|---|---|---|---|---|
| Disperse Dye Ink Composition | | A-1 | A-2 | A-3 | A-4 | A-5 | A-6 | B-1 | B-2 |
| Disperse Dye | DY54 | — | — | — | — | 1.0 | 1.0 | 2.5 | — |
| | DR60 | — | — | 7.0 | 7.0 | 2.5 | 2.5 | — | — |
| | DB359 | 4.5 | 4.5 | — | — | 4.5 | 4.5 | — | 0.8 |
| Dispersing Agent II | | 3.0 | 5.0 | 4.7 | 7.0 | 5.5 | 10.0 | 1.6 | 0.5 |
| Surfactant | BYK348 | 0.8 | 0.8 | 0.8 | 0.8 | 0.8 | 0.8 | 0.8 | 0.8 |
| Solvent | Glycerin | 20 | 20 | 20 | 20 | 20 | 20 | 20 | 20 |
| | Triethyleneglycol | 10 | 10 | 10 | 10 | 10 | 10 | 10 | 10 |

TABLE 2-continued

| Disperse Dye Ink Composition | | A Ink Group | | | | | | B Ink Group | |
|---|---|---|---|---|---|---|---|---|---|
| | | A-1 | A-2 | A-3 | A-4 | A-5 | A-6 | B-1 | B-2 |
| pH Adjusting Agent II | Triethanolamine | 0.5 | 0.5 | 0.5 | 0.5 | 0.5 | 0.5 | 0.5 | 0.5 |
| Chelating Agent | EDTA·2Na | 0.01 | 0.01 | 0.01 | 0.01 | 0.01 | 0.01 | 0.01 | 0.01 |
| Preservative | Proxel GXL | 0.3 | 0.3 | 0.3 | 0.3 | 0.3 | 0.3 | 0.3 | 0.3 |
| Pure Water | | Remainder | Remainder | Remainder | Remainder | Remainder | Remainder | Remainder | Remainder |

Foreign Matter Generation Evaluation 10 mL of a mixed solution was obtained by mixing 99 parts of the water-based cleaning transportation liquid obtained as described above and 1 part of the disperse dye ink composition. A sample X in which the obtained mixed solution was left at 40° C. for a week and a sample Y in which the obtained mixed solution was left at 40° C. for 2 weeks were prepared. Foreign matter in the obtained samples was observed and the generation of foreign matter was evaluated according to the following evaluation criteria.

Evaluation Criteria

A: Foreign matter was not generated in sample X or sample Y

B: Foreign matter was not generated in sample X but foreign matter was generated in sample Y C: Foreign matter was generated in both sample X and sample Y D: A large amount of foreign matter was generated in both sample X and sample Y Discharge Stability Evaluation The water-based cleaning transportation liquid obtained as described above was filled in the ink flow path and the ink container of a recording apparatus (manufactured by Seiko Epson Corporation, Product Name: SureColor SC-F6000). Then, the water-based cleaning transportation liquid was discharged and the recording apparatus was left as is at 40° C. for a week. After being left in this manner, the disperse dye ink composition obtained as described above was filled in the ink flow path and the ink container of the recording apparatus and the discharging stability was evaluated according to the evaluation criteria below by recording normal images on a B0 size target recording medium with an ejection amount of 100%.

Evaluation Criteria

AA: The number of sheets able to be recorded continuously without omission or twisting was 20 sheets or more A: The number of sheets able to be recorded continuously without omission or twisting was 15 sheets to less than 20 sheets B: The number of sheets able to be recorded continuously without omission or twisting was 10 sheets to less than 15 sheets C: The number of sheets able to be recorded continuously without omission or twisting was 5 sheets to less than 10 sheets D: The number of sheets able to be recorded continuously without omission or twisting was less than 5 sheets

TABLE 3

| | | Example I-1 | Example I-2 | Example I-3 | Example I-4 | Comparative Example I-1 | Comparative Example I-2 | Example I-5 |
|---|---|---|---|---|---|---|---|---|
| Cleaning Transportation Liquid | | S-1 | S-2 | S-3 | S-4 | S-5 | S-6 | S-7 |
| Disperse Dye Ink Composition | | | | | A-1 | | | |
| Ratio A | | 0.6 | 0.6 | 0.6 | 0.6 | 0.6 | — | 0.3 |
| Evaluation | Foreign Matter Generation Evaluation | A | A | A | A | A | C | A |
| | Discharge Stability Evaluation | AA | AA | AA | AA | C | D | AA |

| | | Example I-6 | Comparative Example I-3 | Comparative Example I-4 | Example I-7 | Example I-8 | Comparative Example I-5 |
|---|---|---|---|---|---|---|---|
| Cleaning Transportation Liquid | | S-8 | S-9 | S-10 | S-11 | S-12 | S-13 |
| Disperse Dye Ink Composition | | | | A-1 | | | |
| Ratio A | | 1.0 | 2.0 | 6 | 0.2 | 0.1 | 0.075 |
| Evaluation | Foreign Matter Generation Evaluation | A | A | C | A | A | A |
| | Discharge Stability Evaluation | AA | AA | D | A | A | B |

| | | Example II-1 | Example II-2 | Example II-3 | Example II-4 | Comparative Example II-1 | Comparative Example II-2 | Example II-5 |
|---|---|---|---|---|---|---|---|---|
| Cleaning Transportation Liquid | | S-1 | S-2 | S-3 | S-4 | S-5 | S-6 | S-7 |
| Disperse Dye Ink Composition | | | | | A-2 | | | |
| Ratio A | | 1.0 | 1.0 | 1.0 | 1.0 | 1.0 | — | 0.5 |
| Evaluation | Foreign Matter Generation Evaluation | A | A | A | A | A | C | A |
| | Discharge Stability Evaluation | AA | AA | AA | AA | C | D | AA |

| | | Example II-6 | Comparative Example II-3 | Comparative Example II-4 | Example II-7 | Example II-8 | Comparative Example II-5 |
|---|---|---|---|---|---|---|---|
| Cleaning Transportation Liquid | | S-8 | S-9 | S-10 | S-11 | S-12 | S-13 |
| Disperse Dye Ink Composition | | | | A-2 | | | |

TABLE 3-continued

|  |  | | | | | | |
|---|---|---|---|---|---|---|---|
| Evaluation | Ratio A | 1.6667 | 3.3333 | 10 | 0.3333 | 0.1667 | 0.125 |
|  | Foreign Matter Generation Evaluation | A | B | C | A | A | A |
|  | Discharge Stability Evaluation | AA | B | D | AA | A | B |

|  |  | Example III-1 | Example III-2 | Example III-3 | Example III-4 | Comparative Example III-1 | Comparative Example III-2 | Example III-5 |
|---|---|---|---|---|---|---|---|---|
| Cleaning Transportation Liquid | Disperse Dye Ink Composition | S-1 | S-2 | S-3 | S-4 A-3 | S-5 | S-6 | S-7 |
|  | Ratio A | 0.94 | 0.94 | 0.94 | 0.94 | 0.94 | — | 0.47 |
| Evaluation | Foreign Matter Generation Evaluation | A | A | A | A | A | C | A |
|  | Discharge Stability Evaluation | AA | AA | AA | AA | C | D | AA |

|  |  | Example III-6 | Comparative Example III-3 | Comparative Example III-4 | Example III-7 | Example III-8 | Comparative Example III-5 |
|---|---|---|---|---|---|---|---|
| Cleaning Transportation Liquid | Disperse Dye Ink Composition | S-8 | S-9 | S-10 A-3 | S-11 | S-12 | S-13 |
|  | Ratio A | 1.5667 | 3.1333 | 9.4 | 0.3133 | 0.1567 | 0.1175 |
| Evaluation | Foreign Matter Generation Evaluation | A | B | C | A | A | A |
|  | Discharge Stability Evaluation | AA | B | D | AA | A | B |

TABLE 4

|  |  | Example IV-1 | Example IV-2 | Example IV-3 | Example IV-4 | Comparative Example IV-1 | Comparative Example IV-2 | Example IV-5 |
|---|---|---|---|---|---|---|---|---|
| Cleaning Transportation Liquid | Disperse Dye Ink Composition | S-1 | S-2 | S-3 | S-4 A-4 | S-5 | S-6 | S-7 |
|  | Ratio A | 1.4 | 1.4 | 1.4 | 1.4 | 1.4 | — | 0.7 |
| Evaluation | Foreign Matter Generation Evaluation | A | A | A | A | A | D | A |
|  | Discharge Stability Evaluation | AA | AA | AA | AA | C | D | AA |

|  |  | Example IV-6 | Comparative Example IV-3 | Comparative Example IV-4 | Example IV-7 | Example IV-8 | Comparative Example IV-5 |
|---|---|---|---|---|---|---|---|
| Cleaning Transportation Liquid | Disperse Dye Ink Composition | S-8 | S-9 | S-10 A-4 | S-11 | S-12 | S-13 |
|  | Ratio A | 2.3333 | 4.6667 | 14 | 0.4667 | 0.2333 | 0.175 |
| Evaluation | Foreign Matter Generation Evaluation | B | B | D | A | A | A |
|  | Discharge Stability Evaluation | B | C | D | AA | B | B |

|  |  | Example V-1 | Example V-2 | Example V-3 | Example V-4 | Comparative Example V-1 | Comparative Example V-2 | Example V-5 |
|---|---|---|---|---|---|---|---|---|
| Cleaning Transportation Liquid | Disperse Dye Ink Composition | S-1 | S-2 | S-3 | S-4 A-5 | S-5 | S-6 | S-7 |
|  | Ratio A | 1.1 | 1.1 | 1.1 | 1.1 | 1.1 | — | 0.55 |
| Evaluation | Foreign Matter Generation Evaluation | A | A | A | A | A | C | A |
|  | Discharge Stability Evaluation | AA | AA | AA | AA | C | D | AA |

|  |  | Example V-6 | Comparative Example V-3 | Comparative Example V-4 | Example V-7 | Example V-8 | Comparative Example V-5 |
|---|---|---|---|---|---|---|---|
| Cleaning Transportation Liquid | Disperse Dye Ink Composition | S-8 | S-9 | S-10 A-5 | S-11 | S-12 | S-13 |
|  | Ratio A | 1.8333 | 3.6667 | 11 | 0.3667 | 0.1833 | 0.1375 |
| Evaluation | Foreign Matter Generation Evaluation | A | B | C | A | A | A |
|  | Discharge Stability Evaluation | AA | B | D | AA | A | B |

TABLE 4-continued

|  | Example VI-1 | Example VI-2 | Example VI-3 | Example VI-4 | Comparative Example VI-1 | Comparative Example VI-2 | Example VI-5 |
|---|---|---|---|---|---|---|---|
| Cleaning Transportation Liquid | S-1 | S-2 | S-3 | S-4 | S-5 | S-6 | S-7 |
| Disperse Dye Ink Composition | | | | A-6 | | | |
| Ratio A | 2.0 | 2.0 | 2.0 | 2.0 | 2.0 | — | 1.0 |
| Evaluation Foreign Matter Generation Evaluation | B | B | B | B | B | D | A |
| Discharge Stability Evaluation | A | A | A | A | C | D | AA |

|  | Example VI-6 | Comparative Example VI-3 | Comparative Example VI-4 | Example VI-7 | Example VI-8 | Comparative Example VI-5 |
|---|---|---|---|---|---|---|
| Cleaning Transportation Liquid | S-8 | S-9 | S-10 | S-11 | S-12 | S-13 |
| Disperse Dye Ink Composition | | | A-6 | | | |
| Ratio A | 3.3333 | 6.6667 | 20 | 0.6667 | 0.3333 | 0.25 |
| Evaluation Foreign Matter Generation Evaluation | C | D | D | A | A | A |
| Discharge Stability Evaluation | C | D | D | AA | B | B |

TABLE 5

|  | Example VII-1 | Example VII-2 | Example VII-3 | Example VII-4 | Comparative Example VII-1 | Comparative Example VII-2 | Example VII-5 |
|---|---|---|---|---|---|---|---|
| Cleaning Transportation Liquid | S-1 | S-2 | S-3 | S-4 | S-5 | S-6 | S-7 |
| Disperse Dye Ink Composition | | | | B-1 | | | |
| Ratio B | 0.32 | 0.32 | 0.32 | 0.32 | 0.32 | — | 0.16 |
| Evaluation Foreign Matter Generation Evaluation | A | A | A | A | A | C | A |
| Discharge Stability Evaluation | AA | AA | AA | AA | C | D | AA |

|  | Example VII-6 | Comparative Example VII-3 | Comparative Example VII-4 | Example VII-7 | Example VII-8 | Comparative Example VII-5 |
|---|---|---|---|---|---|---|
| Cleaning Transportation Liquid | S-8 | S-9 | S-10 | S-11 | S-12 | S-13 |
| Disperse Dye Ink Composition | | | B-1 | | | |
| Ratio B | 0.5333 | 1.0667 | 3.2 | 0.1067 | 0.0533 | 0.04 |
| Evaluation Foreign Matter Generation Evaluation | A | A | B | A | A | A |
| Discharge Stability Evaluation | AA | A | D | A | A | B |

|  | Example VIII-1 | Example VIII-2 | Example VIII-3 | Example VIII-4 | Comparative Example VIII-1 | Comparative Example VIII-2 | Example VIII-5 |
|---|---|---|---|---|---|---|---|
| Cleaning Transportation Liquid | S-1 | S-2 | S-3 | S-4 | S-5 | S-6 | S-7 |
| Disperse Dye Ink Composition | | | | B-2 | | | |
| Ratio B | 0.1 | 0.1 | 0.1 | 0.1 | 0.1 | — | 0.05 |
| Evaluation Foreign Matter Generation Evaluation | A | A | A | A | A | C | A |
| Discharge Stability Evaluation | AA | AA | AA | AA | C | D | AA |

TABLE 5-continued

| | Example VIII-6 | Comparative Example VIII-3 | Comparative Example VIII-4 | Example VIII-7 | Example VIII-8 | Comparative Example VIII-5 |
|---|---|---|---|---|---|---|
| Cleaning Transportation Liquid | S-8 | S-9 | S-10 | S-11 | S-12 | S-13 |
| Disperse Dye Ink Composition | | | B-2 | | | |
| Ratio B | 0.1667 | 0.3333 | 1.0 | 0.0333 | 0.0167 | 0.0125 |
| Evaluation Foreign Matter Generation Evaluation | A | A | B | A | A | A |
| Discharge Stability Evaluation | AA | A | D | A | A | B |

Here, in the Examples and Comparative Examples described above, water-based cleaning transportation liquids S-1 to S-13 were each set as one level, and in the evaluation results of combinations of the water-based cleaning transportation liquid and each ink composition (Example I-1 to VIII-1, Example I-2 to VIII-2, Example I-3 to VIII-3, Example I-4 to VIII-4, Example I-5 to VIII-5, Example I-6 to VIII-6, Example I-7 to VIII-7, Example I-8 to VIII-8, Comparative Example I-1 to VIII-1, Comparative Example I-2 to VIII-2, Comparative Example I-3 to VIII-3, and Comparative Example I4 to VIII-4, Comparative Example I-5 to VIII-5), those with two or less evaluations of C and two or less evaluations of B were evaluated as ink sets in which the generation of foreign matter was difficult and the discharge stability was not impaired.

The entire disclosure of Japanese Patent Application No. 2015-047612, filed Mar. 10, 2015 is expressly incorporated by reference herein.

What is claimed is:

1. An ink set comprising:
a water-based cleaning transportation liquid; and
a disperse dye ink composition,
wherein the water-based cleaning transportation liquid includes water and at least one of an aromatic sulfonate formalin condensate and a lignin sulfonate as a dispersing agent I, without including a coloring material, and
the disperse dye ink composition includes a disperse dye, water, and a dispersing agent II.

2. The ink set according to claim 1,
wherein a content I of the dispersing agent I with respect to a total amount of the water-based cleaning transportation liquid is 2.0 mass % to 30 mass %,
a content II of the dispersing agent II is 2.0 mass % or more with respect to the total amount of the disperse dye ink composition, and
a ratio A of the content II with respect to the content I (content II/content I) is 0.10 to 3.0.

3. The ink set according to claim 2,
wherein the content I of the dispersing agent I with respect to the total amount of the water-based cleaning transportation liquid is 5.0 mass % to 15 mass %,
the content II of the dispersing agent II is 2.0 mass % or more with respect to the total amount of the disperse dye ink composition, and
the ratio A of the content II with respect to the content I (content II/content I) is 0.30 to 2.0.

4. The ink set according to claim 1,
wherein the content I of the dispersing agent I with respect to the total amount of the water-based cleaning transportation liquid is 2.0 mass % to 30 mass %,
the content II of the dispersing agent II with respect to the total amount of the disperse dye ink composition is less than 2.0 mass %, and
a ratio B of the content II with respect to the content I (content II/content I) is 0.050 to 1.3.

5. The ink set according to claim 4,
wherein the content I of the dispersing agent I with respect to the total amount of the water-based cleaning transportation liquid is 5.0 mass % to 15 mass %,
the content II of the dispersing agent II with respect to the total amount of the disperse dye ink composition is less than 2.0 mass %, and
a ratio B of the content II with respect to the content I (content II/content I) is 0.15 to 0.50.

6. The ink set according to claim 1,
wherein the water-based cleaning transportation liquid further includes a moisturizing agent I,
a content of the moisturizing agent I with respect to the total amount of the water-based cleaning transportation liquid is 5.0 mass % to 30 mass %,
the disperse dye ink composition further includes a moisturizing agent II, and
a content of the moisturizing agent II with respect to the total amount of the disperse dye ink composition is 5.0 mass % to 30 mass %.

7. The ink set according to claim 1,
wherein the water-based cleaning transportation liquid further includes a surface tension adjusting agent, and
a surface tension of the water-based cleaning transportation liquid is 35 mN/m or less.

8. The ink set according to claim 1,
wherein the water-based cleaning transportation liquid further includes a pH adjusting agent I,
a pH of the water-based cleaning transportation liquid is 7.0 to 10.0,
the disperse dye ink composition further includes a pH adjusting agent II, and
a pH of the disperse dye ink composition is 7.0 to 10.0.

9. The ink set according to claim 1,
wherein the dispersing agent II includes at least one of an aromatic sulfonate formalin condensate and a lignin sulfonate.

10. The ink set according to claim 1,
wherein at least one of the dispersing agent I and the dispersing agent II includes at least one of an aromatic sulfonate formalin condensate Na salt and an aromatic sulfonate formalin condensate Ca salt.

11. The ink set according to claim 1,
wherein at least one of the dispersing agent I and the dispersing agent II includes at least one of a lignin sulfonate Na salt and a lignin sulfonate Ca salt.

12. The ink set according to claim 1,
wherein at least one of the dispersing agent I and the dispersing agent II includes a naphthalene sulfonate formalin condensate.

* * * * *